(12) United States Patent
Li et al.

(10) Patent No.: US 6,508,522 B1
(45) Date of Patent: Jan. 21, 2003

(54) MODEL BASED BRAKE PRESSURE ESTIMATION

(75) Inventors: Qingyuan Li, Ann Arbor, MI (US); Quan Zheng, Ann Arbor, MI (US); Keith W. Beyer, Novi, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/091,677

(22) Filed: Mar. 5, 2002

(51) Int. Cl.⁷ .................................................. B60T 8/24

(52) U.S. Cl. ...................................................... 303/139

(58) Field of Search .............................. 303/159, 155, 303/160; 188/72.4

(56) References Cited

U.S. PATENT DOCUMENTS 4,629,039 A * 12/1986 Imoto et al. ................ 188/72.1
5,246,281 A * 9/1993 Leppek .................... 303/114.1

OTHER PUBLICATIONS

Qingyuan Li, Keith W. Beyer and Quan Zhen, "*A Model–Based Brake pressure Estimation Strategy for Traction Control System*", (Reprinted From: Brake Technology, ABS/TCS, and Controlled Suspensions (SP–1576), SAE 2001 World Congress, Detroit, Michigan, Mar. 5–8, 2001, 1–6 pp.).

* cited by examiner

*Primary Examiner*—Christopher P. Schwartz
(74) *Attorney, Agent, or Firm*—Scott A. McBain

(57) ABSTRACT

A method and apparatus are provided for estimating brake pressure in a disk brake caliper, on the basis of a simplified mathematical model. The simplified model is limited to operating conditions in which the caliper piston is holding the brake pads in contact with the rotor, wherein higher order terms and certain fluid dependent terms of the model can be eliminated, thereby simplifying the model to the point that it can be readily used in an effective and efficient manner for estimating fluid pressure in the cylinder of the caliper. The displacement of the piston is estimated while the piston is holding the brake pad in contact with the rotor, as a function of an exchange of fluid between the pressure source and the cylinder. The brake pressure in the cylinder is determined as a function of the displacement of the piston while the piston is holding the brake pad in contact with the rotor. The exchange of fluid between the cylinder and pressure source is estimated as a function of a difference in pressure between the cylinder and the source.

20 Claims, 4 Drawing Sheets

MODEL BASED BRAKE PRESSURE ESTIMATION

TECHNICAL FIELD OF THE INVENTION

This invention relates to vehicle brake systems, and more particularly to estimating brake pressure in the cylinder of a brake caliper in a brake apparatus.

BACKGROUND OF THE INVENTION

Modern wheel driven vehicles often include sophisticated brake systems to improve handling of the vehicle and to enhance traction of the driving wheels. Traction control plays an important role in improving vehicle stability during acceleration. A typical traction control system (TCS) simultaneously controls both engine torque being applied to the driving wheels, and braking force applied to the drive wheels, to reduce spinning of the drive wheels during acceleration. In addition to reducing wheel spin, TCS is also used to preclude overheating of the brake system during braking while under the control of the TCS, or other brake control systems of the vehicle brake apparatus.

For the TCS to perform its desired function, however, it is important that the fluid pressure in the braking device be known to a significant degree of accuracy. For example, in a disk brake device having a caliper with a piston in a fluid cylinder for clamping brake pads against a rotor attached to the wheel, it is necessary that the fluid pressure in the cylinder be known and controlled for proper functioning of the brake during operation in a traction control mode, and also in other brake operational modes.

Although it is possible to install pressure sensors in the braking devices for directly measuring fluid pressure in the cylinder, this is seldom done, because to do so would increase cost, and increase the number of components to be calibrated. Every component that is added is also a potential point of failure, thereby reducing reliability of the brake system.

Instead of adding pressure sensors, most brake control systems utilize an algorithm for estimating fluid pressure in the cylinder. In the past, these algorithms have relied on empirically developed relationships between brake pressure and other parameters known to the brake system. These empirical relationships are determined through extensive testing of vehicles and brake systems, and are generally highly specific to a given brake system. Such relationships are costly to develop and implement in production, however, and do not provide the accuracy of information required for optimal operation of the brake system.

While it has been theoretically possible in the past to develop an algorithm for estimating fluid pressure in a brake cylinder from a mathematical model of a brake system, and then control the brake system in accordance with the model, the on-board computational capacity that would be required to handle all of the linear and non-linear parameters involved in running such an algorithm have been so prohibitive that brake system designers have heretofore opted instead to use the empirically developed relationships described above.

What is needed, therefore, is an improved method and apparatus for estimating fluid pressure in the cylinder of a brake caliper, on the basis of an actual mathematical model of the apparatus that can be used for controlling the brake apparatus in accordance with the estimated brake pressure.

SUMMARY OF THE INVENTION

Our invention provides such an improved method and apparatus for estimating brake pressure in a disk brake caliper, on the basis of a simplified mathematical model. The simplified model was developed through recognition by the inventors, that by limiting the model to operating conditions in which the caliper piston is holding the brake pads in contact with the rotor, higher order terms and certain fluid dependent terms of the model can be eliminated, thereby simplifying the model to the point that it can be readily used in an effective and efficient manner for estimating fluid pressure in the cylinder of the caliper, in an apparatus or method according to our invention. Our invention allows the pressure in the disk brake caliper to be accurately estimated without the use of sensors in the brake apparatus, and requires far fewer calibrations than prior approaches used to determine the pressure in the disk brake caliper.

Our invention may take the form of a method for estimating pressure in the cylinder of a brake apparatus having disk brake caliper including a cylinder adapted for exchanging fluid with a pressure source, and a piston movable in the cylinder in response to pressure within the cylinder from an exchange of fluid between the cylinder and the pressure source, where the piston is adapted for exerting force through a brake pad against a rotor of a disc brake. The method includes estimating a displacement of the piston while the piston is holding the brake pad in contact with the rotor, as a function of an exchange of fluid between the pressure source and the cylinder; and determining a pressure in the cylinder as a function of the displacement of the piston while the piston is holding the brake pad in contact with the rotor. The method may include estimating the exchange of fluid between the cylinder and pressure source as a function of a difference in pressure between the cylinder and the source.

Where the caliper has an effective spring rate, the displacement of the piston while the piston is holding the brake pad in contact with the rotor is a function of the effective spring rate.

Determining the pressure in the cylinder may include calculating the pressure from an equation defining pressure as a function of displacement. Determining the pressure may alternatively include selecting the pressure from a table of pressures as a function of displacement.

Our invention may also include operating the brake apparatus in accordance with the pressure in the cylinder, in a traction control system mode, or in some mode of operation other than TCS.

Our invention may also take the form of an apparatus or a computer program for carrying out a method according to our invention.

The foregoing and other features and advantages of our invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
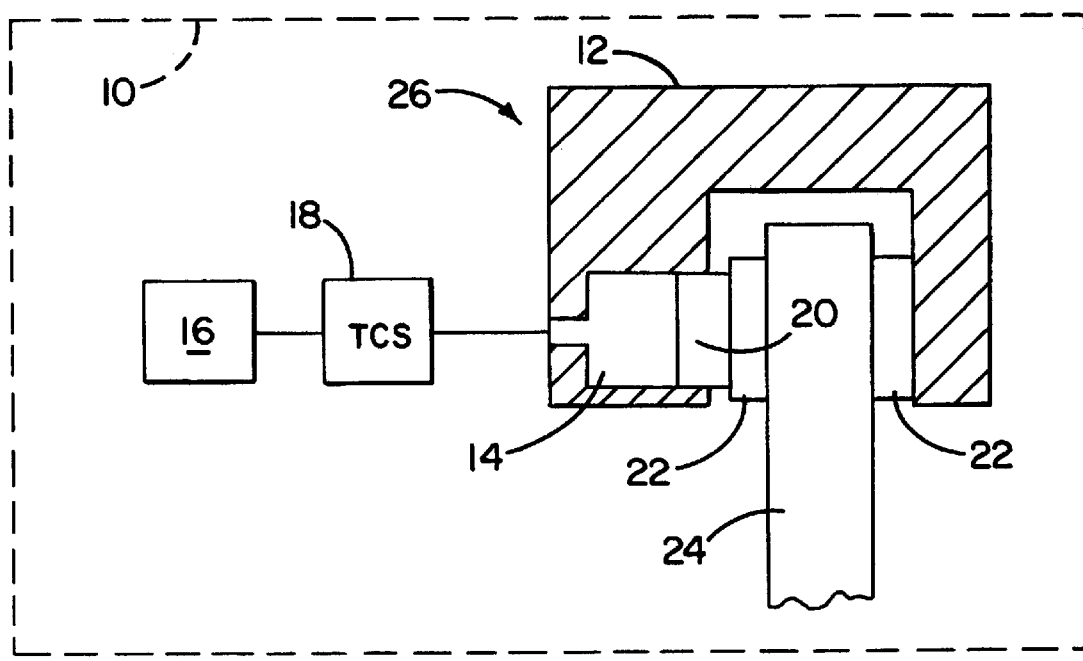
FIG. 1 is a schematic representation of an exemplary brake apparatus, according to our invention.

FIG. 1 is a schematic illustration of an exemplary embodiment of a brake apparatus 10 having disk brake caliper 12 including a cylinder 14 adapted for exchanging fluid with a pressure source, in the form of a base brake system 16 and a traction control system (TCS) module 18. A piston 20 is movable in the cylinder 14, in response to pressure within the cylinder 14 resulting from an exchange of fluid between the cylinder and the pressure source 16, 18. The piston 20 is adapted for exerting force through a pair of brake pads 22 against a rotor 24 of a disk brake 26. It is understood, that the brake apparatus 10 may include more than one disk brake 26 and more than one TCS module 18, but only one is shown for purposes of illustration. It is also understood that a single TCS module 18 may control more than one disk brake 26.

Figure 2:
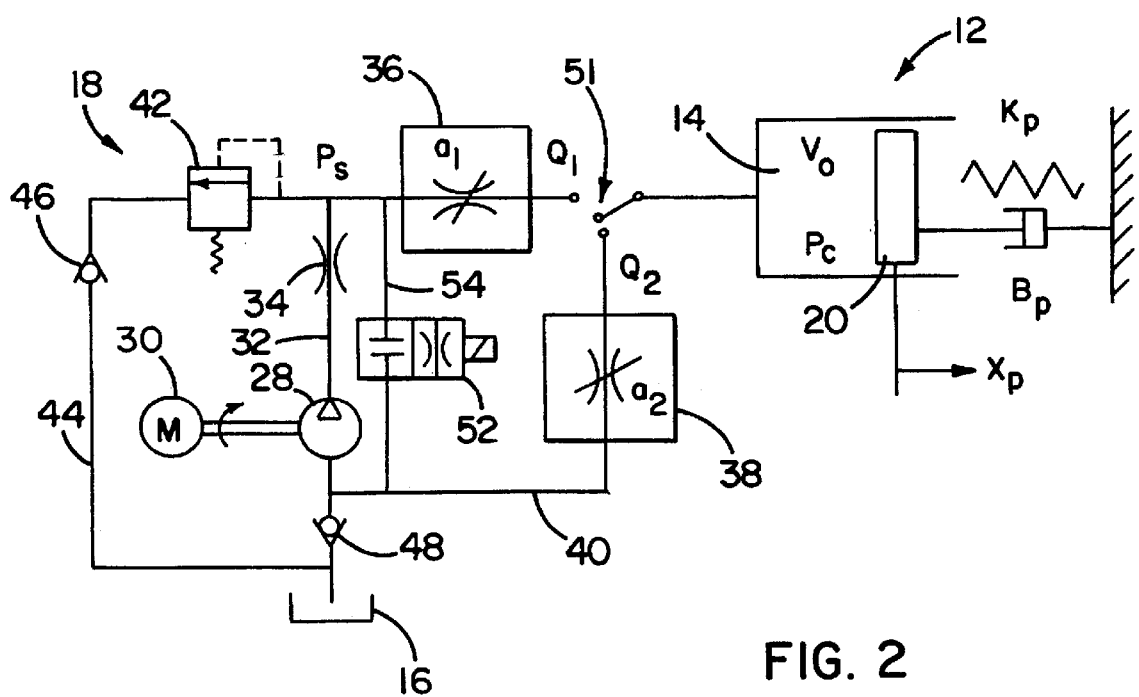
FIG. 2 is a model schematic of one channel of a TCS brake system according to our invention.

FIG. 2 is a schematic illustration of a model including the salient components of the TCS module 18 and the caliper 12, when the brake apparatus 10 is operating in the TCS mode. The TCS module 18 includes a pump 28 driven by a motor 30 for supplying fluid at a supply pressure Ps to the cylinder 14, via a pump outlet line 32, an orifice 34, and a solenoid actuated apply valve 36. Fluid from the cylinder 14 returns to the inlet of the pump 28 via a solenoid operated release valve 38, and a return line 40. The TCS module 18 also includes a pressure relief valve 42, a pressure relief valve return line 44, and two check valves 46, 48, for returning fluid bypassing the apply valve 36 to either the base brake system, represented in FIG. 2 by a reservoir 16, or to the inlet of the pump 28. The TCS module 18 further includes an accumulator 50 connected to the inlet of the pump 28. The accumulator 50 works in conjunction with the orifice 34 to smooth pressure and flow transients in the TCS module 18.

The apply valve 36 is normally open, and the release valve 38 is normally closed. A switching circuit, represented by switch 51, controls the opening and closing of apply and release valves 36, 38. Although many types of switching circuits can be used in practicing our invention, in a preferred embodiment of a brake apparatus 10 according to our invention, the switching may be done by a pulse width modulated (PWM) switching circuit, that can open and close the apply and release valves 36, 38 for known periods of time during TCS, to allow a flow $Q_1$ through the apply valve and a flow $Q_2$ through the release valve 38.

When the brake apparatus 10 is operating in the TCS mode, the motor 30 drives the pump 28. The pressure $P_s$ is higher than the setting of the pressure relief valve 42, and the pump 28 produces sufficient flow that the relief valve 42 is working all of the time, and the pressure $P_s$ can be considered a constant.

When the TCS module 18 is operative, the switching circuit 51 controls the apply and release valves 36, 38 to achieve one of three conditions, known as the APPLY, RELEASE, and HOLD modes.

In the APPLY mode, the release valve 38 is held primarily in the normally closed position, and the apply valve 36 is held primarily in the normally open position by the switching circuit 51, thereby allowing fluid from the pump 28 at the constant pressure $P_s$ to flow through the orifice area $\alpha_1$ of the apply valve 36 and enter the cylinder 14 of the caliper 12. Fluid entering the cylinder 14 causes the piston 20 of the caliper 12 to move to the right as depicted in FIGS. 1 and 2, and move the brake pads 22 into contact with the rotor 24 of the disk brake 26. The volume of the cylinder 14 that must be filled with fluid to bring the pads 22 into clamped contact with the rotor 24 is designated as the initial volume $V_o$. The acceleration $\ddot{x}_p$ and velocity $\dot{x}_p$ of the piston 20 while it is bringing the pads 22 into contact with the rotor 24 is a function of many variables and constants including the flow rates $Q_1$, $Q_2$ in and out of the cylinder, the volume of the cylinder 14, the mass $M_p$ and area $\alpha_p$ of the piston 20, fluid modulus and density effects, a damping coefficient $B_p$ that affects the velocity $\dot{x}_p$ at which the piston 20 can move in the cylinder 14, and an effective spring constant $K_p$ and preload $F_{ko}$ of the caliper 12.

After the piston 20 has moved the brake pads 22 to a fully clamped position where all slack has been taken up, if the switching circuit 51 continues to allow more fluid to flow into the cylinder 14 through the apply valve 36 than is being allowed to exit the cylinder 14 through the release valve 38, the brake pressure $P_c$ within the cylinder 14 will begin to rise, thereby causing the brake pads 22 to clamp down tighter against the rotor 24. As the pressure $P_c$ in the cylinder 14 increases, the piston 20 will continue to be displaced a distance $x_p$ from the point at which the piston 20 has clamped the pads 22 fully into contact with the rotor 24, due to an effective spring rate $K_p$ of the caliper 12 as it deflects under the effect of the braking pressure $P_c$ in the cylinder 14. The amount of this displacement $x_p$ for a typical caliper 24 is small, on the order of 1.0 millimeters for a typical braking force of 10,000 pounds acting against the rotor 24.

In the RELEASE mode, the release valve 38 is held primarily in the open position, and the apply valve 36 is held primarily in the closed position by the switching circuit 51, thereby allowing fluid in the cylinder 14 to be forced out by the effective spring rate $K_p$ of the caliper 12, and returned to the inlet of the pump through the orifice area $a_2$ of the release valve 38. As chamber pressure $P_c$ in the cylinder drops due to the fluid exiting the cylinder 14, the piston 20 moves to the left as depicted in FIGS. 1 and 2, and the clamping force exerted by the brake pads 22 against the rotor 24 is relieved. The acceleration $\ddot{x}_p$ and velocity $\dot{x}_p$ of the piston 20 while it is releasing pressure against the pads 22 and rotor 24 is a function of the same variables listed above in the description of the APPLY mode.

In the HOLD mode, the switching circuit 51 keeps both the apply and release valves 36, 38 primarily closed, to hold pressure in the cylinder 14.

The components of the TCS module 18 described thus far are active when the TCS module 18 is operating in TCS mode, with the motor 30 driving the pump 28, and an isolation valve 52 in the closed position, as depicted in FIG. 2. With the isolation valve 52 in the closed position, as shown, fluid is prevented from bypassing the pump 28. When the TCS module 18 is not operating in TCS mode, the isolation valve 52 is moved to the open position to allow fluid from the base brake system 16 to bypass the pump 28 and flow in and out of the cylinder 14 through the normally open apply valve 36.

Mathematical Model

A mathematical model for the TCS brake pressure control apparatus depicted in FIG. 2 is given by the following equations [1] through [5]:

$$M_p \cdot \ddot{x}_p + B_p \cdot \dot{x}_p + K_p \cdot x_p = P_c \cdot a_p - F_{ko} \quad [1]$$

$$Q_1 - Q_2 = a_p \cdot \dot{x}_p + \frac{V_c + V_o}{\beta} \cdot \frac{dP_c}{dt} \quad [2]$$

-continued $$V_c = a_p \cdot x_p \quad [3]$$

$$Q_1 = C_d \cdot a_1 \cdot \sqrt{\frac{2 \cdot (P_s - P_c)}{\rho}} \quad [4]$$

$$Q_2 = C_d \cdot a_2 \cdot \sqrt{\frac{2 \cdot P_c}{\rho}} \quad [5]$$

Symbol Definition

A summary of the symbols used in this application and their definitions is provided in the following table:

| | |
|---|---|
| $P_s$ | hydraulic line pressure |
| $P_c$ | caliper chamber pressure |
| $X_p$ | caliper piston displacement with the brake pad in contact with the rotor |
| $V_o$ | initial caliper chamber volume |
| $V_c$ | change in caliper chamber volume with brake pad in contact with rotor |
| $Q_1$ | flow rate from apply valve |
| $Q_2$ | flow rate from release valve |
| $a_1$ | orifice area for apply valve |
| $a_2$ | orifice area for release valve |
| $a_p$ | caliper piston area |
| $M_p$ | mass of the piston |
| $B_p$ | damping coefficient |
| $K_p$ | effective spring constant |
| $F_{ko}$ | spring preload |
| $\rho$ | fluid density |
| $C_d$ | orifice flow discharge coefficient |
| $\beta$ | fluid bulk modulus |

Model Simplification

In addressing the problems discussed in the background section above, the inventors came to the realization that the mathematical model of the brake apparatus 10 operating in TCS mode could be simplified in a manner that provided significant advantages in estimating brake pressure. These simplifications came out of a realization that chamber pressure $P_c$ could be estimated accurately, effectively, and efficiently, by considering only the displacement $x_p$ of the piston that occurred as a result of the net flow of fluid in to and out of the cylinder 14 while the piston 20 is holding the brake pads 22 in contact with the rotor 24. This displacement $x_p$, and volume change $V_c$, although small could be utilized to develop a compliance equation for chamber pressure $P_c$ as a function of the displacement $x_p$ for a caliper 12 with a known effective spring rate $K_p$.

By calculating the brake chamber pressure $P_c$ only when the brake pads 22 are in full contact with the rotor 24, the acceleration and velocity terms of equation [1] can be ignored, because while the pads 22 are being held in contact with the rotor 24 there is very little displacement $x_p$ of the piston 20, such that $\ddot{x}_p \approx 0$ and $\dot{x}_p \approx 0$. Equation [1] can therefore be simplified to:

$$K_p \cdot x_p = P_c \cdot a_p - F_{ko} \quad [6]$$

In addition, fluid compliance effects for the small volume of fluid $V_c$ that enters or leaves the cylinder 14 while the pads are in contact with the rotor 24 can also safely be assumed to be negligible, such that $$\frac{V_c + V_o}{\beta} \approx 0.$$

Equation [2] can therefore be reduced to:

$$Q_1 - Q_2 = a_p \cdot \dot{x}_p \quad [7]$$

A compliance equation relating the change in volume while the pads 22 are in contact with the rotor 24, is given as follows, where a and b are constants:

$$V_c = a \cdot P_c^b \quad [8]$$

Combining the above equations, we get:

$$x_p = \frac{a \cdot P_c^b}{a_p} \quad [9]$$

We contemplate that calculations and memory functions associated with solving the above equations and accessing stored data required for computation may be carried in a computational device (not shown) that is carried on board the vehicle, such as a microprocessor or a computer that is utilized by the braking apparatus 10.

Figure 3:
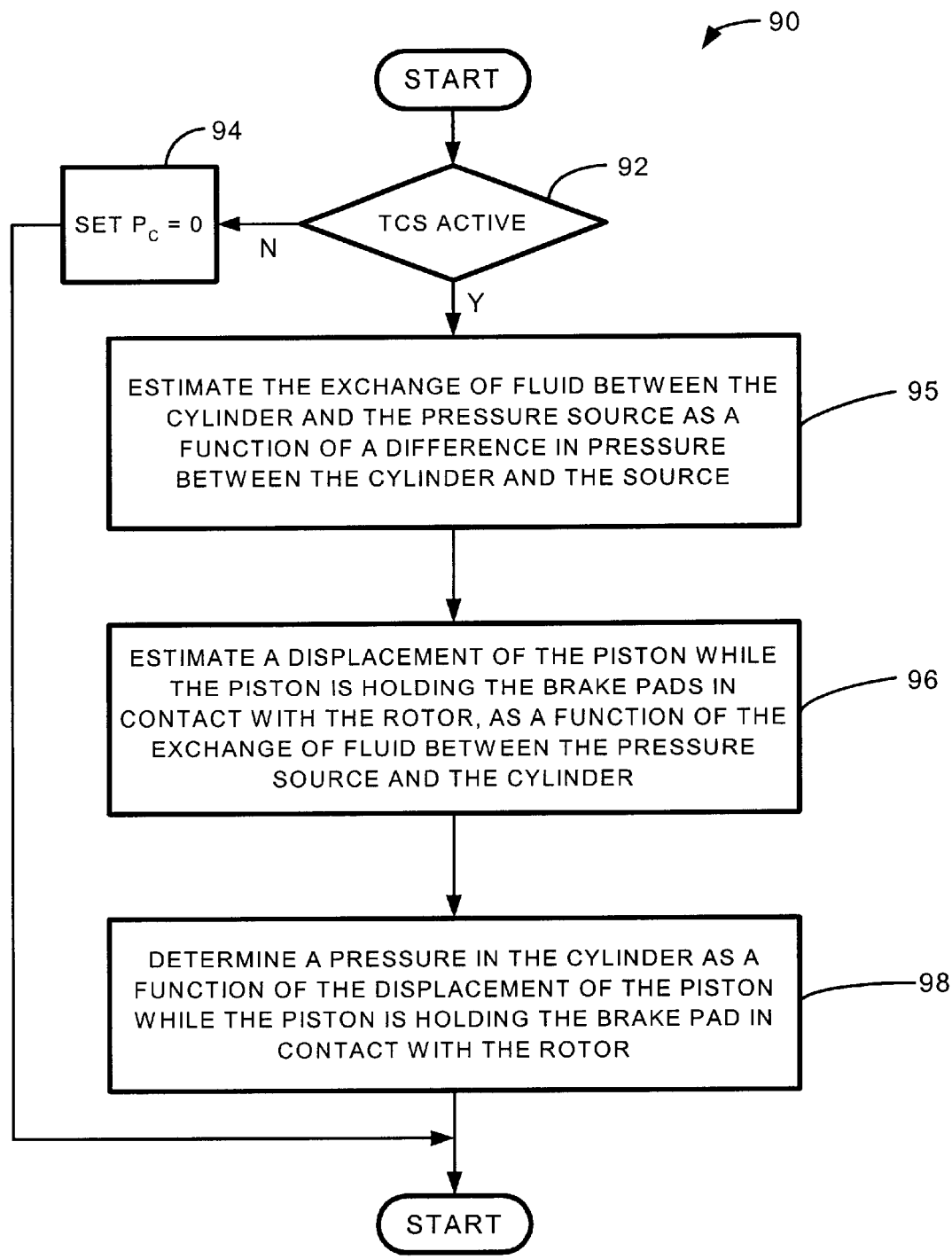
FIG. 3 is a flowchart illustrating a first exemplary embodiment of a method, according to our invention, for estimating brake pressure in the channel of FIG. 2.

FIG. 3 is a flow chart illustrating a method 90, according to our invention, for estimating chamber pressure $P_c$ by using the equations described above, in a brake apparatus 10, as described above, operating in TCS mode. The method 90 is continually iterated at a regular time interval, such as every 10 milliseconds, during operation of the brake apparatus 10, with the values of chamber pressure $P_c$ and displacement $x_p$ being carried forward for use the next iteration of the method 90.

During each iteration of the method 90, the first step is to determine if the TCS system is active, as shown by decision diamond 92. If TCS is not active, the brake chamber pressure $P_c$ in the above equations is set to zero, as shown at block 94, and the other steps 95–98 of the method 100 are not performed during that iteration. When a vehicle having the brake apparatus 10 is first started and has not been moving, or when power is first applied to the controller 18, TCS will not be active, and steps 92 and 94 of the method provide an initial value of zero for chamber pressure $P_c$, in the equations above.

If TCS is active, the method 90 next calculates the flow rates $Q_1$, $Q_2$ through the apply and release valves 36, 38, as shown at block 95 of FIG. 3, using equations [4] and [5] above.

A net displacement $x_p$ of the piston 20 while it has been holding the brake pads 22 against the rotor 24 is then estimated, as shown at block 96, by inserting the flow rates $Q_1$, $Q_2$ determined at block 95 for flow through the apply and release valves 36, 38 into equation [7], and integrating equation [7] to estimate the displacement $x_p$ of the piston 20 while the piston 20 is holding the brake pads 22 in contact with the rotor 24 during the current iteration, and summing the displacement $x_p$ for the current iteration with the displacement $x_p$ for the previous iteration. The time intervals used in integrating equation [7] are determined as a function of the time between iterations, and as a stored function of the time that the switching apparatus 51 held the apply and release valves 36, 38 open during the current iteration.

An updated value for brake pressure $P_c$ in the cylinder 14 is then calculated, as shown at block 98 of FIG. 3, by inserting the net displacement $x_p$ of the piston 20 that has occurred while the piston 20 has been holding the brake pads 22 in contact with the rotor 24, as estimated in block 96, into equation [9], and solving the equation for the brake pressure $P_c$. Alternatively, the brake pressure $P_c$ may be selected from a schedule giving a predetermined value of brake pressure $P_c$ for the net displacement x of the piston 20 that has occurred while the piston 20 has been holding the brake pads 22 in contact with the rotor 24.

Figure 4:
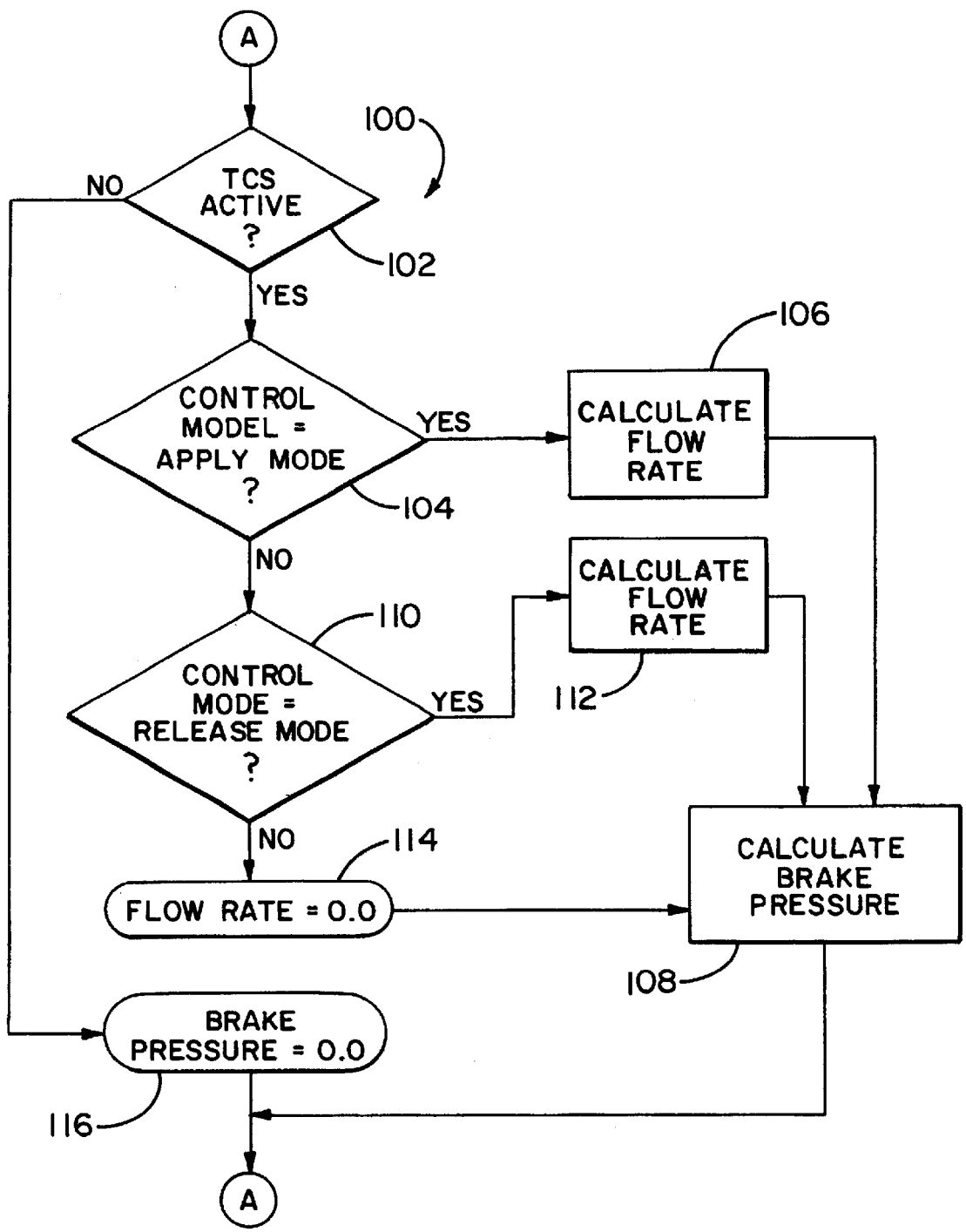
FIG. 4 is a flowchart illustrating a second exemplary embodiment of a method, according to our invention for estimating brake pressure in the channel of FIG. 2.

FIG. 4 is a flow chart illustrating a second method 100, according to our invention, for estimating chamber pressure $P_c$ in a brake apparatus 10, as described above, operating in TCS mode. The method 100 is continually iterated at a regular time interval, such as every 10 milliseconds, during operation of the brake apparatus 10, with the values of chamber pressure $P_c$ and net displacement $x_p$ of the piston 20 being carried forward for use the next iteration of the method 100.

During each iteration of the method 100, the first step is to determine if the TCS system is active, as shown by decision diamond 102. If TCS is not active, the brake chamber pressure $P_c$ in the above equations is set to zero, as shown at block 116, and the other steps 104–114 of the method 100 are not performed during that iteration. When a vehicle having the brake apparatus 10 is first started and the vehicle ahs not been moving, or when power is first applied to the controller 18, TCS will not be active, and steps 102 and 116 of the method provide an initial value of zero for chamber pressure PC in the equations above.

If TCS is active, the method 100 next sequentially checks to see if the brake apparatus 10 is operating in the APPLY mode or the RELEASE mode, as shown by decision diamonds 104 and 110.

If the brake apparatus 10 is operating in a TCS APPLY mode, as determined at diamond 104, the method 100 calculates the flow rate $Q_1$ through the apply valve 36, using equation [4] above, as shown at block 106 and assigns a value of zero to the flow rate $Q_2$ through the release valve 38, for use in equations [7] above. An updated value for the brake chamber pressure $P_c$ is then calculated, as shown at block 108 of FIG. 4, in the same manner as described above in relation to blocks 96 and 98 of FIG. 3.

If the brake apparatus 10 is operating in a TCS RELEASE mode, as determined at block 110, the method 100 calculates the flow rate $Q_2$ through the release valve 38, using equation [5] above, as shown at decision block 112 and assigns a value of zero to the flow rate $Q_1$ through the release valve 38, for use in equation [7] above. An updated value for the brake chamber pressure $P_c$ is then calculated, as shown at block 108 of FIG. 4, in the same manner as described above in relation to blocks 96 and 98 of FIG. 3.

If the brake apparatus 10 is not operating in either an APPLY or a RELEASE mode during TCS, as determined at diamonds 104 and 110, the brake apparatus 10 is operating in the TCS HOLD mode, and method 100 proceeds to block 114, where the flow rate is set to zero for use in equation [7]. An updated value for the brake chamber pressure $P_c$ is then calculated, as shown at block 108 of FIG. 4, in the same manner as described above in relation to blocks 96 and 98 of FIG. 3. Because the flow rate has been set to zero for the current iteration, the summed net value of the net displacement $x_p$ of the piston 20 that has occurred while the piston 20 has been holding the brake pads 22 in contact with the rotor 24 will remain the same as it was for the preceding iteration, and the updated value for brake pressure $P_c$ in the cylinder 14 calculated by solving equation [9] for the current iteration will produce the same value of estimated brake pressure $P_c$ that was calculated during the preceding iteration.

The second exemplary method 100 is thus a simplification of the first method 90, because the flow rate is only calculated for TCS mode that the brake apparatus 10 is operating in at the time the method 100 enters the current iteration. Where the time between iterations is small, this simplification results in negligible differences between the brake pressure estimated per the first and second methods 90, 100, and allows the number of computations required per iteration to be reduced. This reduction in computations required per iteration places less demand on capacity of the processor used for performing the method. Either of the methods 90, 100 described above, in accordance with our invention, allows the brake pressure $P_c$ to be estimated on the basis of an actual mathematical model of the system, rather than from empirical data as was the case in prior brake systems, in an efficient and effective manner that can be carried out in the type and size of processors available for use in vehicle brake systems.

Once the brake pressure $P_c$ has been estimated according to our invention, we contemplate that the estimation will be used by the vehicle brake apparatus 10 during TCS for controlling either or both of the engine torque and operation of the switching circuit 51 to regulate the brake pressure $P_c$. We also contemplate that our invention may be utilized in brake apparatus modes and operations other than TCS mode. For example, the estimated brake pressure $P_c$ may be used for estimating the temperature of the brake rotor 24, and controlling the brake 26 in a manner that precludes or reduces brake fade.

While the embodiments of our invention disclosed herein are presently considered to be preferred, various changes and modifications can be made without departing from the spirit and scope of the invention. The scope of the invention is indicated in the appended claims. We intend that all changes or modifications within the meaning and range of equivalents are embraced by the claims.

We claim:

1. In a brake apparatus having disk brake caliper including a cylinder adapted for exchanging fluid with a pressure source, and a piston movable in the cylinder in response to pressure within the cylinder from an exchange of fluid between the cylinder and the pressure source, the piston being adapted for exerting force through a brake pad against a rotor of a disc brake, a method for estimating pressure in the cylinder comprising:

estimating a displacement of the piston while the piston is holding the brake pad in contact with the rotor, as a function of an exchange of fluid between the pressure source and the cylinder; and determining a pressure in the cylinder as a function of the displacement of the piston while the piston is holding the brake pad in contact with the rotor.

2. The method of claim 1 further comprising estimating the exchange of fluid between the cylinder and pressure source as a function of a difference in pressure between the cylinder and the source.

3. The method of claim 1 wherein the caliper has an effective spring rate and the displacement of the piston while the piston is holding the brake pad in contact with the rotor is a function of the effective spring rate.

4. The method of claim 1 wherein determining the pressure in the cylinder further comprises calculating the pressure from an equation defining pressure as a function of displacement.

5. The method of claim 1 wherein determining the pressure comprises selecting the pressure from a table of pressures as a function of displacement.

6. The method of claim 1 further comprising operating the brake apparatus in accordance with the pressure in the cylinder.

7. The method of claim 6 further comprising operating the brake apparatus in a traction control system (TCS) mode.

8. In a brake apparatus having disk brake caliper including a cylinder adapted for exchanging fluid with a pressure source, and a piston movable in the cylinder in response to pressure within the cylinder from an exchange of fluid between the cylinder and the pressure source, the piston being adapted for exerting force through a brake pad against a rotor of a disc brake, means for estimating pressure in the cylinder comprising:

means for estimating a displacement of the piston while the piston is holding the brake pad in contact with the rotor, as a function of an exchange of fluid between the pressure source and the cylinder; and means for determining a pressure in the cylinder as a function of the displacement while the piston is holding the brake pad in contact with the rotor.

9. The brake apparatus of claim 8 further comprising means for estimating the exchange of fluid between the cylinder and pressure source as a function of a difference in pressure between the cylinder and the source.

10. The brake apparatus of claim 8 wherein the caliper has an effective spring rate and the displacement of the piston while the piston is holding the brake pad in contact with the rotor is a function of the effective spring rate.

11. The brake apparatus of claim 8 wherein the means for determining the pressure in the cylinder further comprises means for calculating the pressure from an equation defining pressure as a function of displacement.

12. The brake apparatus of claim 8 wherein the means for determining the pressure comprises means for selecting the pressure from a table of pressures as a function of displacement.

13. The brake apparatus of claim 8 further comprising means for operating the brake apparatus in accordance with the pressure in the cylinder.

14. The brake apparatus of claim 13 further comprising operating the brake apparatus in a traction control system (TCS) mode.

15. In a brake apparatus having disk brake caliper including a cylinder adapted for exchanging fluid with a pressure source, and a piston movable in the cylinder in response to pressure within the cylinder from an exchange of fluid between the cylinder and the pressure source, the piston being adapted for exerting force through a brake pad against a rotor of a disc brake, a computer readable medium storing a computer program for estimating pressure in the cylinder, the computer program comprising:

computer readable code for estimating a displacement of the piston while the piston is holding the brake pad in contact with the rotor, as a function of an exchange of fluid between the pressure source and the cylinder; and computer readable code for determining a pressure in the cylinder as a function of the displacement while the piston is holding the brake pad in contact with the rotor.

16. The computer readable medium of claim 15 further comprising computer readable code for estimating the exchange of fluid between the cylinder and pressure source as a function of a difference in pressure between the cylinder and the source.

17. The computer readable medium of claim 15 wherein the caliper has an effective spring rate and the displacement of the piston while the piston is holding the brake pad in contact with the rotor is a function of the effective spring rate.

18. The computer readable medium of claim 15 wherein the computer readable code for determining the pressure in the cylinder further comprises computer readable code for calculating the pressure from an equation defining pressure as a function of displacement.

19. The computer readable medium of claim 15 wherein the computer readable code for determining the pressure comprises computer readable code for selecting the pressure from a table of pressures as a function of displacement.

20. The computer readable medium of claim 15 further comprising computer readable code for operating the brake apparatus in accordance with the pressure in the cylinder.

* * * * *